(12) United States Patent
Meng et al.

(10) Patent No.: US 9,142,039 B2
(45) Date of Patent: Sep. 22, 2015

(54) METHOD AND APPARATUS FOR IMPROVING SPEED OF RASTERIZING TRANSPARENT IMAGES

(71) Applicants: PEKING UNIVERSITY FOUNDER GROUP CO., LTD., Beijing (CN); BEIJING FOUNDER ELECTRONICS CO., LTD., Beijing (CN)

(72) Inventors: Zhangwei Meng, Beijing (CN); Hao Lin, Beijing (CN); Ken Chen, Beijing (CN)

(73) Assignees: Peking University Founder Group Co., Ltd., Beijing (CN); Beijing Founder Electronics Co., Ltd., Beijing (CN)

( * ) Notice: Subject to any disclaimer, the term of this patent is extended or adjusted under 35 U.S.C. 154(b) by 360 days.

(21) Appl. No.: 13/732,020

(22) Filed: Dec. 31, 2012

(65) Prior Publication Data
US 2013/0169665 A1    Jul. 4, 2013

(30) Foreign Application Priority Data
Dec. 31, 2011   (CN) .......................... 2011 1 0460600

(51) Int. Cl.
*G06T 11/00*   (2006.01)
*G06T 11/40*   (2006.01)

(52) U.S. Cl.
CPC ............... *G06T 11/001* (2013.01); *G06T 11/40* (2013.01)

(58) Field of Classification Search
CPC ...................................................... G06T 11/001
See application file for complete search history.

(56) References Cited

U.S. PATENT DOCUMENTS

| | | | |
|---|---|---|---|
| 5,428,724 A * | 6/1995 | Silverbrook | 345/640 |
| 6,856,421 B1 * | 2/2005 | Amir et al. | 358/1.18 |
| 2005/0280847 A1 * | 12/2005 | Cairns et al. | 358/1.9 |
| 2009/0021754 A1 * | 1/2009 | Cairns | 358/1.9 |
| 2010/0053705 A1 * | 3/2010 | Huang et al. | 358/487 |
| 2011/0122138 A1 * | 5/2011 | Schmidt et al. | 345/440 |
| 2011/0231797 A1 * | 9/2011 | Huhtala et al. | 715/811 |

* cited by examiner

*Primary Examiner* — Kee M Tung
*Assistant Examiner* — Grace Q Li
(74) *Attorney, Agent, or Firm* — Finnegan, Henderson, Farabow, Garrett & Dunner, LLP

(57) ABSTRACT

A method for improving a speed of rasterizing transparent images, comprising determining, from P graphic entity objects on a transparent page, M transparent images and N nontransparent images. Each of the N nontransparent images includes an intersecting area with one of the M transparent images, P is an integer larger than 0, M is an integer larger than 0 and smaller than or equal to P, N is an integer larger than or equal to 0 and smaller than P, and P=M+N. The method also comprises determining a page-level transparent area and a page-level de-transparentizing area of the P graphic entity objects. Contributions of the transparent images and the nontransparent images to the page-level transparent area and the page-level de-transparentizing area are calculated using different methods. The methods further comprises assembling the M transparent images according to the page-level transparent area and the page-level de-transparentizing area.

9 Claims, 4 Drawing Sheets

| No. | Transparent image | Resolution of transparent image | Resolution of background graph element object | Coverage area |
|---|---|---|---|---|
| a | YES | 150*150 | 600*600 | Aa |
| b | NO | | | Ab |
| c | YES | 252*264 | | A c |
| d | YES | 752*1046 | | A d |
| e | YES | 106*139 | | Ae |

METHOD AND APPARATUS FOR IMPROVING SPEED OF RASTERIZING TRANSPARENT IMAGES

RELATED APPLICATIONS

This application claims the benefit of priority from Chinese Patent Application No. 201110460600.2, filed Dec. 31, 2011, the entire contents of which are incorporated herein by reference.

FIELD

The present disclosure relates to image rasterizing and, more particularly, to a method and apparatus for improving a speed of rasterizing a transparent image.

BACKGROUND

Conventionally, when drawing a graphic entity object, two imaging models are usually used: substitute imaging model and transparent imaging model.

In the substitute imaging model, a graphic entity object newly drawn on a page completely replaces a background content at the location of the graphic entity object. That is, a final color of a point at the location is determined by a last graphic entity object drawn at the location. In the transparent imaging model, a transparent graphic entity object newly drawn on a page and a prior background content at the location of the graphic entity object are mixed. That is, the final color of a point at the location is determined by all graphic entity objects drawn at the location.

However, in the transparent imaging model, graphic entity objects newly drawn on a page may first need to be assembled. Since no prior determination is made on whether each of the graphic entity objects newly drawn on the page is a transparent image or a nontransparent image, calculations need to be performed during the assembling process on all graphic entity objects newly drawn in the page. Therefore, the calculation is complicated.

Moreover, in the transparent imaging model, transparency calculation needs to be performed on a graphic entity object newly drawn on a page and a prior background content at the location of the graphic entity object. When the resolution of the background content is high, there may be a large amount of data in the transparency calculation, and thus the calculation may be complicated, and time consuming.

SUMMARY

In accordance with the present disclosure, there is provided a method for improving a speed of rasterizing transparent images, comprising determining, from P graphic entity objects on a transparent page, M transparent images and N nontransparent images. Each of the N nontransparent images includes an intersecting area with one of the M transparent images, P is an integer larger than 0, M is an integer larger than 0 and smaller than or equal to P, N is an integer larger than or equal to 0 and smaller than P, and P=M+N. The method also comprises determining a page-level transparent area and a page-level de-transparentizing area of the P graphic entity objects. Contributions of the transparent images and the nontransparent images to the page-level transparent area and the page-level de-transparentizing area are calculated using different methods. The method further comprises assembling the M transparent images according to the page-level transparent area and the page-level de-transparentizing area.

Also in accordance with the present disclosure, there is provided an apparatus for improving a speed of rasterizing transparent images, comprising a first determining module configured to determine, from P graphic entity objects on a transparent page, M transparent images and N nontransparent images. Each of the N nontransparent images includes an intersecting area with one of the M transparent images, P is an integer larger than 0, M is an integer larger than 0 and smaller than or equal to P, N is an integer larger than or equal to 0 and smaller than P, and P=M+N. The apparatus also comprises a second determining module configured to determine a page-level transparent area and a page-level de-transparentizing area of the P graphic entity objects. Contributions of the transparent images and the nontransparent images to the page-level transparent area and the page-level de-transparentizing area are calculated using different methods. The apparatus further comprises an assembling module configured to assemble the M transparent images according to the page-level transparent area and the page-level de-transparentizing area.

Features and advantages consistent with the disclosure will be set forth in part in the description which follows, and in part will be obvious from the description, or may be learned by practice of the disclosure. Such features and advantages will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

DESCRIPTION OF THE EMBODIMENTS

Consistent with the present disclosure, a transparent image refers to an image graphic entity with transparency. A nontransparent image refers to a type of graphic entity other than the transparent image.

Consistent with the present disclosure, a transparent area refers to an area in which a graphic entity is to be assembled according to a transparent model. A de-transparentizing area refers to an area in which a graphic entity to be subjected to a de-transparentizing calculation and then assembled according to the substitute model. The transparent area and the de-transparentizing area may be at a page level or at a graphic entity level.

Consistent with the present disclosure, in a physical space, a page-level de-transparentizing area may be equivalent to an area of the set of transparent images that does not intersect with other graphic entity. A page-level transparent area may be an area in the original transparent area that does not belong to the de-transparentizing area.

The page-level transparent area and the page-level de-transparentizing area are an overall statistic. In the physical space, the page-level transparent area and the page-level de-transparentizing area may be larger than or equal to the union of the graphic-entity-level transparent area and the graphic-entity-level de-transparentizing area of individual transparent images.

Consistent with the present disclosure, the graphic-entity-level transparent area and the graphic-entity-level de-transparentizing area may refer to a transparent area and a de-transparentizing area, respectively, of a transparent image. A drawing area of a single graphic entity, i.e., a single transparent image, is divided into two parts: a graphic-entity-level transparent area and a graphic-entity-level de-transparentizing area.

Hereinafter, embodiments consistent with the disclosure will be described with reference to drawings. Wherever possible, the same reference numbers will be used throughout the drawings to refer to the same or like parts.

Figure 1:
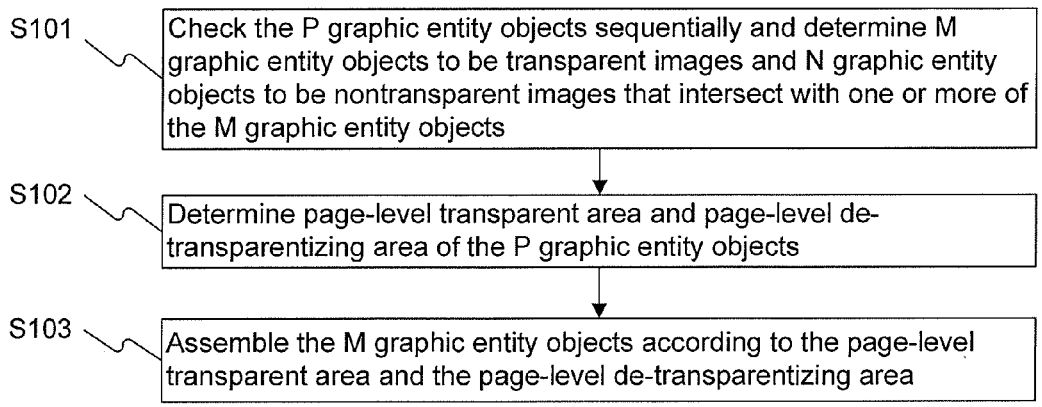
FIG. 1 is a flow chart showing a method for improving the speed of rasterizing transparent images according to an exemplary embodiment.

FIG. 1 shows a method for improving the speed of rasterizing transparent images consistent with embodiments of the present disclosure. In some embodiments, application of the methods consistent with the present disclosure to a transparent page including W graphic entity objects is described. Among the W graphic entity objects, P graphic entity objects are transparent images or nontransparent images intersecting with one or more of the transparent images, while the rest S (i.e., W=P+S) graphic entity objects are nontransparent images that do not intersect with any of the transparent images, where W is an integer larger than or equal to 1, P is an integer larger than 0 and smaller than or equal to W, and S is an integer larger than or equal to 0 and smaller than W.

As shown in FIG. 1, at S101, the P graphic entity objects are sequentially checked. Among the P graphic entity objects, M graphic entity objects are determined to be transparent images and N graphic entity objects are determined to be nontransparent images that intersect with one or more of the M graphic entity objects. P=M+N, where M is an integer larger than 0 and smaller than or equal to P, and N is an integer larger than or equal to 0 and smaller than P.

At S102, a page-level transparent area and a page-level de-transparentizing area of the P graphic entity objects are determined by sequentially adding the contribution of each of the P graphic entity objects. When determining the contribution of the transparent images and the nontransparent images to the page-level transparent area and the page-level de-transparentizing areas, different methods may be used, as described below.

In some embodiments, before the page-level transparent area and the page-level de-transparentizing area of the P graphic entity objects are determined, a coverage area of each of the P graphic entity objects may be determined.

As indicated above, the page-level transparent area and the page-level de-transparentizing area are determined by sequentially adding the contribution of each of the 1st through the P-th graphic entity object. When an m-th graphic entity object, which is a transparent image, is considered, the page-level transparent area is calculated according to formula $At_m = At_{m-1} + Ac_m \cap Adt_{m-1}$, where $1 \leq m \leq P$. In this formula, $At_m$ represents a page-level transparent area formed after the m-th graphic entity object is determined sequentially among the P graphic entity objects. When m=P, $At_m$ represents the page-level transparent area of the P graphic entity objects. Similarly, $At_{m-1}$ represents a page-level transparent area formed after the (m−1)-th graphic entity object is determined sequentially among the P graphic entity objects, and $Adt_{m-1}$ represents a page-level de-transparentizing area formed after the (m−1)-th graphic entity object (which may be a transparent image or a nontransparent image) is determined sequentially among the P graphic entity objects. When m=1, i.e., when calculating the contribution of the 1st graphic entity object (here assuming the 1st graphic entity object is a transparent image), both $At_{m-1}$ and $Adt_{m-1}$ are zero. $Ac_m$ represents a coverage area of the m-th graphic entity object.

Similarly, the page-level de-transparentizing area is calculated according to formula $Adt_m = Adt_{m-1} + Ac_m - (Adt_{m-1} \cap Ac_m) - (At_{m-1} \cap Ac_m)$, where $Adt_m$ represents a page-level de-transparentizing area formed after the m-th graphic entity object is determined sequentially among the P graphic entity objects. Other symbols similar to those in the formula for calculating the transparent area represent similar variables.

Consistent with embodiments of the present disclosure, when an n-th graphic entity object, which is a nontransparent image, is considered, the page-level transparent area is calculated according to formula of $At_n = At_{n-1} + Ac_n$, where $1 \leq n \leq P$. In this formula, $At_n$ represents a page-level transparent area formed after the n-th graphic entity object is determined sequentially among the P graphic entity objects. When n=P, $At_n$ represents the final page-level transparent area of the P graphic entity objects. Similarly, $At_{n-1}$ represents a page-level transparent area formed after the (n−1)-th graphic entity object (which may be a transparent image or a nontransparent image) is determined sequentially among the P graphic entity objects. When n=1, i.e., when calculating the contribution of the 1st graphic entity object (here assuming the 1st graphic entity object is a nontransparent image), $At_{n-1}$ is zero. $Ac_n$ represents a coverage area of the n-th graphic entity object.

Similarly, the page-level de-transparentizing area is calculated according to formula $Adt_n = Adt_{n-1} - (Adt_{n-1} \cap Ac_n)$, where $Adt_n$ represents a page-level de-transparentizing area formed after the n-th graphic entity object is determined sequentially among the P graphic entity objects, and $Adt_{n-1}$ represents a page-level de-transparentizing area formed after the (n−1)-th graphic entity object objects (which may be a transparent image or a nontransparent image) is determined sequentially among the P graphic entity. When n=1, i.e., when calculating the contribution of the 1st graphic entity object (here assuming the 1st graphic entity object is a nontransparent image), $At_{n-1}$ is zero.

At S103, the M graphic entity objects, which are transparent images, are assembled according to the page-level transparent area and the page-level de-transparentizing area of the P graphic entity objects.

Consistent with embodiments of the present disclosure, resolutions of the M graphic entity objects are compared with a resolution of a device page. If the resolution of a graphic entity object is lower than the resolution of the device page, the graphic-entity-level transparent area and the graphic-entity-level de-transparentizing area of the graphic entity object may be processed differently.

Figure 2:
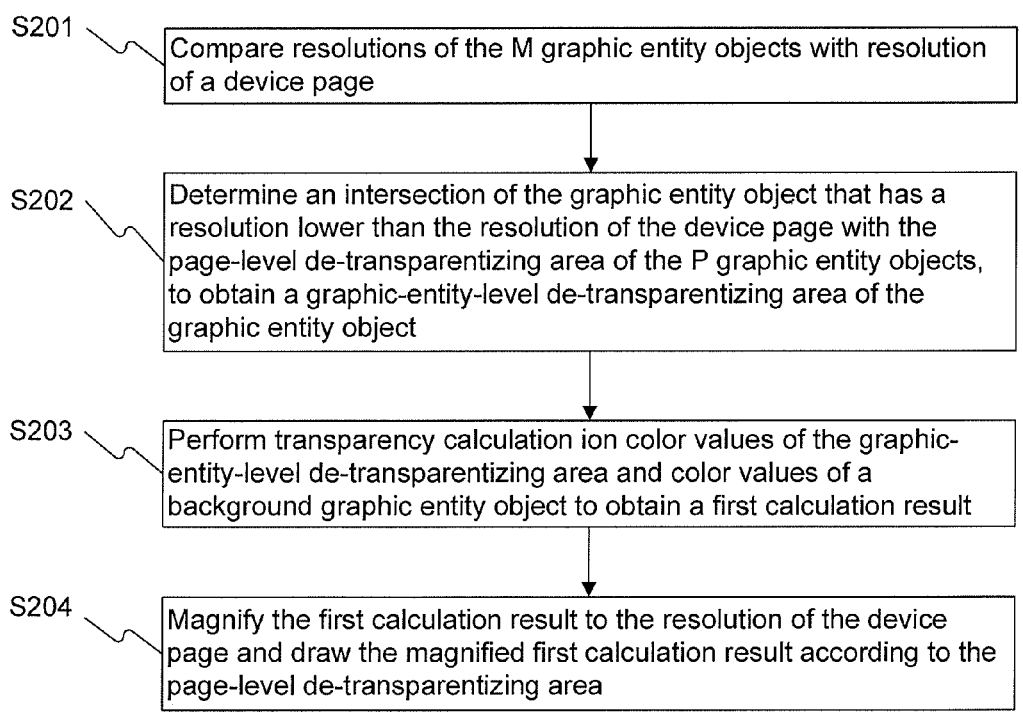
FIG. 2 is a flow chart showing a method for assembling graphic entity objects according to an exemplary embodiment.

FIG. 2 shows a process for assembling the M graphic entity objects consistent with embodiments of the present disclosure.

At S201, the resolutions of the M graphic entity objects are compared with the resolution of the device page.

If at least one graphic entity object has a resolution lower than the resolution of the device page, at S202, an intersection of the at least one graphic entity object with the page-level de-transparentizing area of the P graphic entity objects is determined, to obtain a graphic-entity-level de-transparentizing area of the at least one graphic entity object.

At S203, transparency calculation is performed on color values of the graphic-entity-level de-transparentizing area and color values of a background graphic entity object to obtain a first calculation result.

At S204, the first calculation result is magnified to the resolution of the device page and the magnified first calculation result is drawn according to the page-level de-transparentizing area.

Figure 3:
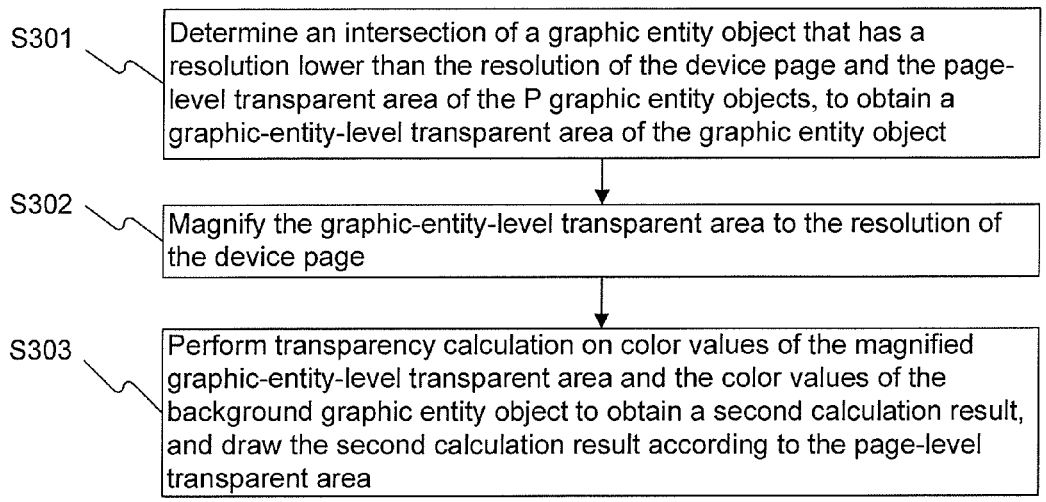
FIG. 3 is a flow chart showing a method for assembling a transparent area of a graphic entity object according to an exemplary embodiment.

FIG. 3 shows a process for assembling the transparent areas of the M graphic entity objects.

At S301, an intersection of the at least one graphic entity object, which has a resolution lower than the resolution of the device page, and the page-level transparent area of the P graphic entity objects is determined, to obtain a graphic-entity-level transparent area of the at least one graphic entity object.

At S302, the graphic-entity-level transparent area is magnified to the resolution of the device page.

At S303, transparency calculation is performed on color values of the magnified graphic-entity-level transparent area and the color values of the background graphic entity object to obtain a second calculation result. The second calculation result is drawn according to the page-level transparent area.

If the resolution of a graphic entity object of the M graphic entity objects is higher than the resolution of the device page, such a graphic entity object is scaled to the resolution of the device page. Transparency calculation is performed on color values of the scaled graphic entity object and the color values of the background graphic entity object. A third calculation result is obtained and drawn.

Figure 4:
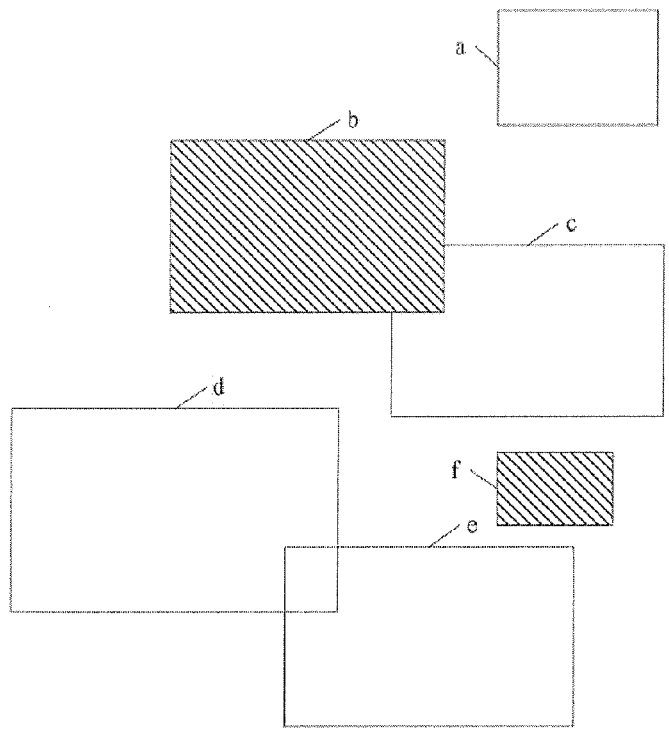
FIG. 4 schematically shows six graphic entity objects on a device page.
Figures 5, 6:
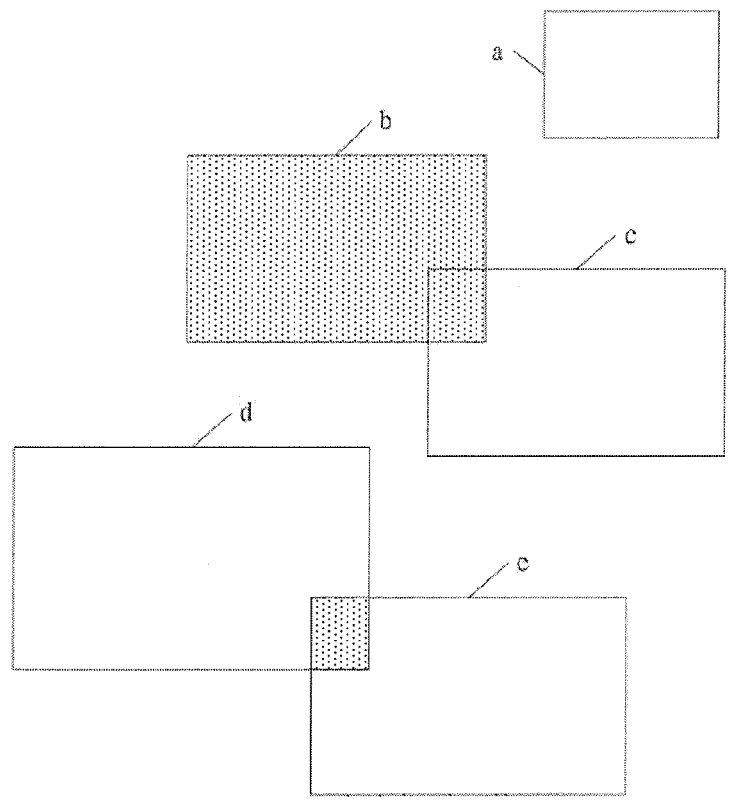
FIG. 5 illustrates specific contents of five graphic entity objects obtained sequentially according to an exemplary embodiment.
FIG. 6 schematically shows a page-level transparent area and a page-level de-transparentizing area obtained according embodiments of the present disclosure.

FIGS. 4-6 schematically illustrate an exemplary process consistent with embodiments of the present disclosure.

Referring to FIG. 4, six graphic entity objects are shown, which are labeled a, b, c, d, e, and f, respectively. Among these graphic entity objects, graphic entity objects a, c, d, and e are transparent images, and graphic entity objects b and f are nontransparent images. In addition, the graphic entity object b has an overlapping area with the graphic entity object c, and the graphic entity object d has an overlapping area with the graphic entity object e. The graphic entity object f is a nontransparent image not overlapping with any other graphic entity object, that is, it will not be processed. The transparent images and the nontransparent images having an overlapping area with the transparent images will be processed sequentially. Therefore, as shown in FIG. 5, contents of the five graphic entity objects obtained sequentially are provided in the device page.

The graphic entity object a is the 1st graphic entity object and is a transparent image. Therefore, the page-level transparent area after the graphic entity object a is processed is calculated as follows:

$$At_1 = At_0 + Ac_1 \cap Adt_0 = \text{Null} + Aa \cap \text{Null} = \text{Null}$$

$At_1$ represents a page-level transparent area after the 1st graphic entity object, i.e., the graphic entity object a, is determined sequentially from the five graphic entity objects. Since the graphic entity object a is the 1st graphic entity object, $At_0$ is Null. $Adt_0$ represents a page-level de-transparentizing area before the 1st graphic entity object, i.e., the graphic entity object a, is determined. Therefore, $Adt_0$ is also Null. $Ac_1$ is the coverage area of the graphic entity object a, which is Aa.

The result of the above calculation is Null, indicating that no page-level transparent area is formed after the 1st graphic entity object, i.e., the graphic entity object a, is determined sequentially from the five graphic entity objects.

The page-level de-transparentizing area after the graphic entity object a is processed is calculated as follows:

$$Adt_1 = Adt_0 + Ac_1 - (Adt_0 \cap Ac_1) - (At_0 \cap Ac_1) = \text{Null} + Aa - (\text{Null} \cap Aa) - (\text{Null} \cap Aa) = Aa$$

That is, the page-level de-transparentizing area formed after the 1st graphic entity object, i.e., the graphic entity object a, is determined sequentially from the five graphic entity objects, is Aa.

The graphic entity object b is the 2nd graphic entity object and is a nontransparent image. The page-level transparent area after the graphic entity object b is processed is calculated as follows:

$$At_2 = At_1 + Ac_2 = \text{Null} + Ab = Ab$$

$Ac_2$ is a coverage area of the graphic entity object b, which is Ab. The calculation result indicates that the page-level transparent area formed after the 2nd graphic entity object, i.e., the graphic entity object b, is determined sequentially from the five graphic entity objects, is Ab.

The page-level de-transparentizing area after the graphic entity object b is processed is calculated as follows:

$$Adt_2 = Adt_1 - (Adt_1 \cap Ac_2) = Aa - (Aa \cap Ab) = Aa$$

The calculation result indicates that the page-level de-transparentizing area formed after the 2nd graphic entity object, i.e., the graphic entity object b, is determined sequentially from the five graphic entity objects, is Aa.

The graphic entity object c is the 3rd graphic entity object and is the second transparent image. The page-level transparent area after the graphic entity object c is processed is calculated as follows:

$$At_3 = At_2 + Ac_3 \cap Adt_2 = Ab + Ac \cap Aa = Ab$$

$At_2$ represents a page-level transparent area formed after the 2nd graphic entity object, i.e., the graphic entity object b, is determined sequentially from the five graphic entity objects, and $Adt_2$ represents a page-level de-transparentizing area formed after the 2nd graphic entity object, i.e., the graphic entity object b, is determined sequentially from the five graphic entity objects. $Ac_3$ is a coverage area of the graphic entity object c, which is Ac.

The calculation result indicates that the page-level transparent area formed after the 3rd graphic entity object, i.e., the graphic entity object c, is determined sequentially from the five graphic entity objects, is Ab.

The page-level de-transparentizing area after the graphic entity object c is processed is calculated as follows:

$$Adt_3 = Adt_2 + Ac_3 - (Adt_2 \cap Ac_3) - (At_2 \cap Ac_3) =$$
$$Aa + Ac - (Aa \cap Ac) - (Ab \cap Ac) = Aa + Ac - (Ab \cap Ac)$$

The calculation result indicates that the page-level de-transparentizing area formed after the 3rd graphic entity object, i.e., the graphic entity object c, is determined sequentially from the five graphic entity objects, is Aa+Ac−(Ab∩Ac).

The graphic entity object d is the 4th graphic entity object and is the third transparent image. The page-level transparent area after the graphic entity object d is processed is calculated as follows:

$$At_4=At_3+Ac_4 \cap Adt_3=Ab+Ad \cap (Aa+Ac-(Ab \cap Ac))=Ab$$

Ata represents a page-level transparent area formed after the 3rd graphic entity object, i.e., the graphic entity object c, is determined sequentially from the five graphic entity objects, and $Adt_3$ represents a page-level de-transparentizing area formed after the 3rd graphic entity object, i.e., the graphic entity object c, is determined sequentially from the five graphic entity objects. $Ac_4$ is a coverage area of the graphic entity object d, which is Ad.

The calculation result indicates that the page-level transparent area formed after the 4th graphic entity object, i.e., the graphic entity object d, is determined sequentially from the five graphic entity objects, is Ab.

The page-level de-transparentizing area after the graphic entity object d is processed is calculated as follows:

$$Adt_4=Adt_3+Ac_4-(Adt_3 \cap Ac_4)-(At_3 \cap Ac_4)=Aa+Ac-(Ab \cap Ac)+Ad-(Aa+Ac-(Ab \cap Ac) \cap Ad)-(Ab \cap Ad)=Aa+Ac+Ad-(Ab \cap Ac)$$

The calculation result indicates that the page-level de-transparentizing area formed after the 4th graphic entity object, i.e., the graphic entity object d, is determined sequentially from the five graphic entity objects, is Aa+Ac+Ad−(Ab∩Ac).

The graphic entity object e is the 5th graphic entity object and is the fourth transparent image. The page-level transparent area after the graphic entity e is processed is calculated as follows:

$$At_5=At_4+Ac_5 \cap Adt_4=Ab+Ae \cap (Aa+Ac+Ad-(Ab \cap Ac))=Ab+Ae \cap Ad$$

$At_4$ represents a page-level transparent area formed after the 4th graphic entity object, i.e., the graphic entity object d, is determined sequentially from the five graphic entity objects, and $Adt_4$ represents a page-level de-transparentizing area formed after the 4th graphic entity object, i.e., the graphic entity object d, is determined sequentially from the five graphic entity objects. $Ac_5$ is a coverage area of the graphic entity object e, which is Ae.

The calculation result indicates that the page-level transparent area formed after the 5th graphic entity object, i.e., the graphic entity object e, is determined sequentially from the five graphic entity objects, is Ab+Ae∩Ad.

The page-level de-transparentizing area after the graphic entity object e is processed is calculated as follows:

$$Adt_5=Adt_4+Ac_5-(Adt_4 \cap Ac_5)-(At_4 \cap Ac_5)=Aa+Ac+Ad-(Ab \cap Ac)+Ae-(Aa+Ac+Ad-(Ab \cap Ac) \cap Ae)-(Ab \cap Ae)=Aa+Ac+Ad+Ae-(Ab \cap Ac)-(Ad \cap Ae)$$

The calculation result indicates that the page-level de-transparentizing area formed after the 5th graphic entity object, i.e., the graphic entity object e, is determined sequentially from the five graphic entity objects, is Aa+Ac+Ad+Ae−(Ab∩Ac)−(Ad∩Ae).

After the page-level transparent area and the page-level de-transparentizing area formed after the five graphic entity objects are processed are calculated, the transparent images can be assembled respectively using the page-level transparent area and the page-level de-transparentizing area.

The graphic entity object a is a transparent image. Assume the graphic entity object a has a resolution of 150*150, which is lower than the resolution of the device page. Since the graphic-entity-level transparent area of the graphic entity a is Null, no calculation is performed on the graphic-entity-level transparent area of the graphic entity a.

The graphic entity object a has an intersection Aa with the page-level de-transparentizing area of the five graphic entity objects, which indicates that the graphic-entity-level de-transparentizing area of the graphic entity object a is Aa, occupying 1/1 of the coverage area of the graphic entity object a. Transparency calculation is performed on the color values of the graphic-entity-level de-transparentizing area of the graphic entity object a and the color values of the device page. The calculation result is magnified to the resolution of the device page and drawn.

The amount of calculation can be reduced by drawing after the transparency calculation is performed on the graphic entity object a as compared to drawing directly without transparency calculation. The optimization factor of the transparency calculation on the graphic entity object a may be calculated as follows:

$$(600*600)/(150*150)=16$$

For the graphic entity object b, since it is a nontransparent image, a different method may be used for calculation and drawing.

The graphic entity object c is a transparent image. Assume the graphic entity object c has a resolution of 252*164, which is lower than the resolution of the device page.

The graphic entity object c has an intersection Ac−(Ab∩Ac) with the page-level de-transparentizing area of the five graphic entity objects, which indicates that a graphic-entity-level de-transparentizing area of the graphic entity object c is Ac−(Ab∩Ac) (assume this occupies 29/30 of the coverage area of the graphic entity object c). Transparency calculation is performed on the color values of the graphic-entity-level de-transparentizing area of the graphic entity object c and the color values of the device page. The calculation result is magnified to the resolution of the device page and drawn.

Similarly, the graphic entity object c has an intersection Ab∩Ac with the page-level transparent area of the five graphic entity objects, which indicates that a graphic-entity-level transparent area of the graphic entity object c is Ab∩Ac, occupying 1/30 of the coverage area of the graphic entity object c. The graphic-entity-level transparent area of the graphic entity object c is magnified to the resolution of the device page, and transparency calculation is performed on the color values of the magnified graphic-entity-level transparent area of the graphic entity object c and the color values of the background graphic entity object. The calculation result is drawn.

The optimization factor of the transparency calculation on the graphic entity object c may be calculated as follows:

$$(600*600)/(252*264*29/30+600*600*1/30)=4.7$$

The graphic entity object d is a transparent image. Assuming the graphic entity object has a resolution of 752*1064, which is higher than the resolution of the device page.

The graphic entity object d is scaled to the resolution of the device page. Transparency calculation is performed on the color values of the scaled graphic entity object d and the color values of the background graphic entity object, and the calculation result is drawn.

The optimization factor of the transparency calculation on the graphic entity object d may be calculated as follows:

(600*600)/(600*600)=1

The graphic entity object e may be assembled similar to the graphic entity object c, and thus a description thereof is omitted.

FIG. 6 schematically shows the page-level transparent area and the page-level de-transparentizing area formed after the five graphic entity objects are processed.

As can be seen from the above example, the larger the difference between the resolution of a background content and the resolution of a transparent image is, the higher the optimization factor may be, and consequently the better the optimization effect may be.

Figure 7:
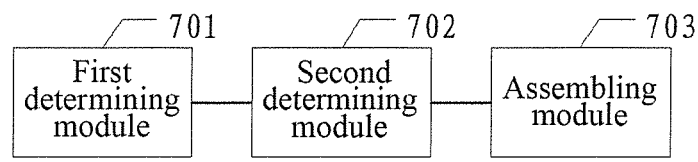
FIG. 7 is a schematic diagram showing an apparatus for improving the speed of rasterizing transparent images according to another exemplary embodiment.

FIG. 7 schematically shows an apparatus for improving the speed of rasterizing transparent images consistent with embodiments of the present disclosure. In some embodiments, the apparatus consistent with the present disclosure may be applied to a transparent page including W graphic entity objects. Among the W graphic entity objects, P graphic entity objects are transparent images or nontransparent images that intersecting with one or more of the transparent images, while the rest S (i.e., W=P+S) graphic entity objects are nontransparent images that do not intersect with any of the transparent images, where W is an integer larger than or equal to 1, P is an integer larger than 0 and smaller than or equal to W, and S is an integer larger than or equal to 0 and smaller than W.

The apparatus comprises a first determining module 701 configured to check the P graphic entity objects sequentially and to determine, among the P graphic entity objects, M graphic entity objects that are transparent images and N graphic entity objects that are nontransparent images and include an intersecting area with the M graphic entity objects, where P=M+N, M represents an integer larger than 0 and smaller than or equal to P, and N represents an integer larger than or equal to 0 and smaller than P.

As shown in FIG. 7, the apparatus also comprises a second determining module 702 configured to determine a page-level transparent area of the P graphic entity objects and a page-level de-transparentizing area of the P graphic entity objects. When determining the contribution of the transparent images and the nontransparent images to the page-level transparent area and the page-level de-transparentizing area, different methods may be used.

The apparatus shown in FIG. 7 further comprises an assembling module 703 configured to assemble the M graphic entity objects according to the page-level transparent area and the page-level de-transparentizing area of the P graphic entity objects.

Methods and systems consistent with embodiments of the present disclosure may have following technical effects.

First, a transparent image is divided into areas and calculation is performed on the areas, and different operations are performed on transparent images and nontransparent images. Therefore, the amount of calculation is reduced.

Second, a transparent image is divided into areas and different operations are performed on the different areas. Therefore, the amount of calculation on the transparent image is reduced, and the time spent is shortened.

Third, a transparent image is divided into areas and different operations are performed on the different areas. Therefore, the larger the difference between the resolution of a background content and the resolution of the transparent image is, the lower the amount calculation may be.

Consistent with embodiments of the present disclosure, a computer is provided which is able to carry out the methods for adjusting spacing between characters. The computer may be, for example, a personal computer, a workstation, a parallel computer, or a super computer. The computer may comprise one or more input devices, such as a keyboard, a mouse, or a control panel, for receiving user instructions or user-set parameters. The computer may also comprise one or more output devices, such as a display or a printer. The display may be used to display the drawn image.

Consistent with embodiments of the present disclosure, one or more non-transitory storage medium storing a computer program are provided to implement the system and method for improving speed of rasterizing transparent images. The one or more non-transitory storage medium may be installed in a computer or provided separately from a computer. A computer may include one or more processors coupled to the storage medium that read the computer program from the storage medium and execute the program to perform the methods consistent with embodiments of the present disclosure. The storage medium may be a magnetic storage medium, such as hard disk, floppy disk, or other magnetic disks, a tape, or a cassette tape. The storage medium may also be an optical storage medium, such as optical disk (for example, CD or DVD). The storage medium may further be a semiconductor storage medium, such as DRAM, SRAM, EPROM, EEPROM, flash memory, or memory stick.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for improving a speed of rasterizing transparent images, comprising:
    determining, from P graphic entity objects on a transparent page, M transparent images and N nontransparent images, each of the N nontransparent images including an intersecting area with one of the M transparent images, P being an integer larger than 0, M being an integer larger than 0 and smaller than or equal to P, N being an integer larger than or equal to 0 and smaller than P, and P=M+N;
    determining a page-level transparent area and a page-level de-transparentizing area of the P graphic entity objects, contributions of the transparent images and the nontransparent images to the page-level transparent area and the page-level de-transparentizing area being calculated using different methods; and
    assembling the M transparent images according to the page-level transparent area and the page-level de-transparentizing area,
    wherein the assembling the M transparent images comprises:
        comparing a resolution of each of the M transparent images with a resolution of a device page; and
        for a low-resolution graphic entity object having a resolution lower than the resolution of the device page:
            determining an intersection of the low-resolution graphic entity object with the page-level de-transparentizing area, and obtaining a graphic-entity-level de-transparentizing area of the low-resolution graphic entity object,
            performing transparency calculation on a color value of the graphic-entity-level de-transparentizing area and a color value of a background graphic entity object to obtain a first calculation result, and magnifying the first calculation result to the resolution of the device page and drawing the magnified first calculation result according to the page-level de-transparentizing area.

2. The method of claim 1, further comprising:
determining, before the determining the page-level transparent area and the page-level de-transparentizing area, a coverage area of each of the P graphic entity objects.

3. The method of claim 2, wherein:
a formula $At_m = At_{m-1} + Ac_m \cap Adt_{m-1}$ is used to calculate the page-level transparent area when a contribution of an m-th graphic entity object of the P graphic entity objects, which is a transparent image, is considered, $1 \leq m \leq P$, $At_m$ is a page-level transparent area formed after the m-th graphic entity object is determined sequentially among the P graphic entity objects, $At_{m-1}$ is a page-level transparent area formed after an (m−1)-th graphic entity object is determined sequentially among the P graphic entity objects, $Adt_{m-1}$ is a page-level de-transparentizing area formed after the (m−1)-th graphic entity object is determined sequentially among the P graphic entity objects, and $Ac_m$ is the coverage area of the m-th graphic entity object.

4. The method of claim 2, wherein:
a formula $Adt_m = Adt_{m-1} + Ac_m - (Adt_{m-1} \cap Ac_m) - (At_{m-1} \cap Ac_m)$ is used to calculate the page-level de-transparentizing area when a contribution of an m-th graphic entity object of the P graphic entity objects, which is a transparent image, is considered, $1 \leq m \leq P$, $Adt_m$ is a page-level de-transparentizing area formed after the m-th graphic entity object is determined sequentially among the P graphic entity objects, $Adt_{m-1}$ is a page-level de-transparentizing area formed after an (m−1)-th graphic entity object is determined sequentially among the P graphic entity objects, $At_{m-1}$ is a page-level transparent area formed after the (m−1)-th graphic entity object is determined sequentially among the P graphic entity objects, and $Ac_m$ is the coverage area of the m-th graphic entity object.

5. The method of claim 2, wherein:
a formula $At_n = At_{n-1} + Ac_n$ is used to calculate the page-level transparent area when a contribution of an n-th graphic entity object of the P graphic entity objects, which is a nontransparent image, is considered, $1 \leq n \leq P$, $At_n$ is a page-level transparent area formed after the n-th graphic entity object is determined sequentially among the P graphic entity objects, $At_{n-1}$ is a page-level transparent area formed after an (n−1)-th graphic entity object is determined sequentially among the P graphic entity objects, and $Ac_n$ is the coverage area of the n-th graphic entity object.

6. The method of claim 2, wherein:
a formula $Adt_n = Adt_{n-1} - (Adt_{n-1} \cap Ac_n)$ is used to calculate the page-level de-transparentizing area when a contribution of an n-th graphic entity object of the P graphic entity objects, which is a nontransparent image, is considered, $1 \leq n \leq P$, $Adt_n$ is a page-level de-transparentizing area formed after the n-th graphic entity object is determined sequentially among the P graphic entity objects, $Adt_{n-1}$ is a page-level de-transparentizing area formed after an (n−1)-th graphic entity object is determined sequentially among the P graphic entity objects, and $Ac_n$ is the coverage area of the n-th graphic entity object.

7. The method of claim 1, wherein the assembling the M transparent images further comprises:
for the low-resolution graphic entity object:
determining an intersection of the low-resolution graphic entity object with the page-level transparent area, and obtaining a graphic-entity-level transparent area of the low-resolution graphic entity object, magnifying the graphic-entity-level transparent area to the resolution of the device page, and performing transparency calculation on a color value of the magnified graphic-entity-level transparent area and the color value of the background graphic entity object to obtain a second calculation result and drawing the second calculation result according to the page-level transparent area of the transparent image.

8. The method of claim 1, wherein the assembling the M transparent images further comprises:
for a high-resolution graphic entity object having a resolution higher than the resolution of the device page:
scaling the high-resolution graphic entity object to the resolution of the device page, performing transparency calculation on a color value of the scaled high-resolution graphic entity object and a color value of the background graphic entity object to obtain a third calculation result, and drawing the third calculation result.

9. A non-transitory computer-readable storage medium with an executable program stored thereon, wherein the program, when executed by at least one processor, causes a computing device to perform operations comprising:
determining, from P graphic entity objects on a transparent page, M transparent images and N nontransparent images, each of the N nontransparent images including an intersecting area with one of the M transparent images, P being an integer larger than 0, M being an integer larger than 0 and smaller than or equal to P, N being an integer larger than or equal to 0 and smaller than P, and P=M+N;

determining a page-level transparent area and a page-level de-transparentizing area of the P graphic entity objects, contributions of the transparent images and the nontransparent images to the page-level transparent area and the page-level de-transparentizing area being calculated using different methods; and assembling the M transparent images according to the page-level transparent area and the page-level de-transparentizing area, wherein the assembling the M transparent images comprises:
comparing a resolution of each of the M transparent images with a resolution of a device page; and for a low-resolution graphic entity object having a resolution lower than the resolution of the device page:
determining an intersection of the low-resolution graphic entity object with the page-level de-transparentizing area, and obtaining a graphic-entity-level de-transparentizing area of the low-resolution graphic entity object, performing transparency calculation on a color value of the graphic-entity-level de-transparentizing area and a color value of a background graphic entity object to obtain a first calculation result, and magnifying the first calculation result to the resolution of the device page and drawing the magnified first calculation result according to the page-level de-transparentizing area.

* * * * *